(12) United States Patent
Okita et al.

(10) Patent No.: US 6,181,391 B1
(45) Date of Patent: Jan. 30, 2001

(54) COLOR DISPLAY DEVICE WITH ONE LIGHT SOURCE ON ONE SIDE AND TWO LIGHT SOURCES ON THE OTHER SIDE OF THE LIGHT GUIDE PLATE

(75) Inventors: Masaya Okita, Tokyo; Yasuo Aritake, Isehara; Kohei Matsuyama, Isehara; Masaya Kimura, Isehara; Kazunari Matsui, Isehara, all of (JP)

(73) Assignee: Bright Lab Co., Ltd., Tokyo (JP)

( * ) Notice: Under 35 U.S.C. 154(b), the term of this patent shall be extended for 0 days.

(21) Appl. No.: 09/208,309

(22) Filed: Dec. 11, 1998

(30) Foreign Application Priority Data

Dec. 11, 1997 (JP) .................................. 9-341576
Dec. 11, 1997 (JP) .................................. 9-341577

(51) Int. Cl.$^7$ .......................... G02F 1/1335; G01D 11/28; F21V 7/04
(52) U.S. Cl. ................... 349/65; 362/27; 362/31
(58) Field of Search ................... 349/64, 65, 68; 362/26, 27, 31

(56) References Cited

U.S. PATENT DOCUMENTS

| | | | |
|---|---|---|---|
| 4,958,911 | 9/1990 | Beiswenger et al. | 350/331 R |
| 5,039,207 | 8/1991 | Green | 359/49 |
| 5,453,855 | * 9/1995 | Nakamura et al. | 349/68 |
| 5,845,035 | * 12/1998 | Wimberger-Friedl | 349/65 |
| 5,931,555 | * 8/1999 | Akahane et al. | 349/65 |

FOREIGN PATENT DOCUMENTS

| | | |
|---|---|---|
| 4-186315 | 7/1992 | (JP) . |
| 6-138459 | 5/1994 | (JP) . |

* cited by examiner

Primary Examiner—Walter J. Malinowski
(74) Attorney, Agent, or Firm—Foley & Lardner

(57) ABSTRACT

A color display device has a single light guiding plate, and first, second and third light sources that respectively independently exhibit three primary colors. On a one end surface of the light guiding plate there are disposed the first and second light sources that exhibit two different ones of the three primary colors. On the other end surface side of the light guiding plate there is disposed the third light source that exhibits the remaining one primary color. Since the light guiding means is needed only one in number, the structure can be simplified and miniaturized. Also, on the one end surface of the light guiding means there are disposed, of the three light sources exhibiting the three primary colors, the first and second light sources that exhibit two different ones of the three primary colors. And, on the other end surface side of the light guiding means there is disposed the third light source that exhibits the remaining one primary color. Therefore, the probability that the light which enters into the light guiding means from one light source is hindered by another light source decreases. Accordingly, the loss of the light becomes lessened and the amount of light emission increases.

10 Claims, 2 Drawing Sheets

COLOR DISPLAY DEVICE WITH ONE LIGHT SOURCE ON ONE SIDE AND TWO LIGHT SOURCES ON THE OTHER SIDE OF THE LIGHT GUIDE PLATE

BACKGROUND OF THE INVENTION

The present invention relates to a color display device.

Recently, color liquid crystal display devices are used in OA devices such as computers and displays of domestic electrified products such as televisions. As this type of color liquid crystal display device, there is widely known a color liquid display device of a TFT system. The color liquid crystal display device of a TFT system comprises color filters corresponding to three primary with thin film transistors (TFT), and a backlight having white color light sources. In this display device, liquid crystals corresponding to the respective color filters are made open by a drive circuit and light is transmitted through the liquid crystal made open, thereby obtaining a mosaic color mixture based on the combination of red, green and blue.

The above-described color liquid crystal display device of a TFT system enables the procurement of a clear full color image. However, on the other hand, the minute color filters of red, green and blue are needed for the respective pixel. Since the color filters are expensive parts in the color liquid display device.

Under the above-described circumstances, recently, there is proposed a color-filterless color liquid crystal display device which a three primary color backlight is combined with a monochromatic liquid crystal cell without the use of color filter and thin film transistor (see, for example, Japanese Patent Application Laid-Open Publication No. 6-138459). In this display device, pulse luminescence is caused of the three primary color light sources sequentially on a periodic basis, and the liquid crystal is made open with the same timing as that with which color light is given forth by such pulse luminescence to thereby green and blue.

Also, there is known a display device wherein three light guiding means are sequentially piled up, and any one of three primary color light sources is disposed in each of the light guiding means to thereby control the color distribution of each of the light sources through the on and off operation of respective switches, namely so-called electrically ornamented signboard.

However, in the above-described filterless color liquid crystal display device or electrically ornamented signboard, although many proposals concerning the control of the liquid crystal cell have hitherto bean made, there are not so many practical proposals concerning a backlight. For example, this type of backlight has three light sources. Therefore, miniaturization thereof is difficult. On the other hand, a color filter is provided on a light source side so as to obtain a pure color having a high degree of chromaticness. This raises the specific problem of being accompanied by an increase in the number of the parts used, with the result that the light utilization efficiency becomes inferior. No practical solution to this specific problem has hitherto existed.

SUMMERY OF THE INVENTION

The present invention has been made in view of the above-described conventional techniques and has an object to provide a structure which can solve the specific problem for the color-filterless color display device.

The present invention provides a color display device, which is equipped with singular light guiding means that faces a liquid crystal cell and first, second and third light sources that respectively independently exhibit three primary colors. The first and second light sources are disposed on a one-end surface side of the light guiding means. The third light source is disposed on the other-end surface side.

According to this construction, since the light guiding means is only one in number, the structure can be simplified and miniaturized. Also, since of the three light sources exhibiting the primary colors the first and second light sources exhibiting respectively two primary colors are disposed on one-end surface side of he light guiding means and the third light source exhibiting the remaining one primary color is disposed on the other-end surface of the light guiding means, the probability decreases that the light which enters from one light source to the light guiding means is hardened by the other light sources. This decreases the light loss and increases the amount of outgoing light.

Reflecting means for directing the light from the light sources toward the light guiding means may be disposed on one-end surface and the other-end surface of the light guiding means.

According to this construction, the lights from the light sources can be efficiently condensed by the reflecting means on to one-end and the other-end surface of the light guiding means. Therefore, there increases the luminance of the light guiding means.

The light sources may be caused to make their pulse luminescence in synchronism with the drive timing with which the liquid of the liquid crystal cell is driven.

According to this construction, by sequentially periodically causing pulse luminescence of the primary color light sources and opening the liquid crystal with the same timing at which this pulse luminescence is made, a residual color mixture is obtained based on the combination of red, green, and blue colors.

Diffusing means may be provided on one surface of the light guiding means facing the liquid crystal cell, dots may be provided on the other surface of the light guiding means, and a reflecting member that covers the other surface of the light guiding means may be provided.

According to this construction, since the diffusing means, dots, and reflecting member are provided, the light that has entered into the light guiding means is made to go out toward the liquid crystal cell side by being diffused. Therefore, the light sources and dots are not seen, with the result that the luminance can be made uniform.

The diffusing means may be constructed using a diffusion sheet.

According to this construction, the diffusing means is constituted by a freely demountable sheet-like member. Therefore, the operation of tuning the diffusing means at the developing time becomes easy to perform. This results in a decrease in the developing cost and thus becomes one factor causing a decrease in the manufacturing cost.

The first light source may consists of a transparent color-developing tube and may be located nearer to the light guiding means than the second light source.

According to this construction, the whole or a part of light from the second light source enters into the light guiding means by passing through the first light source. At this time, since the first light source is a transparent color-developing tube and, in the condition of its being lit out, is transparent, the light from the second light source passes sufficiently through the first light source and enters into the light guiding means. For this reason, the loss of the light from the second light source due to the effect of the light source is suppressed to being kept small, with the result that the amount of light emission increases.

The transparent color-developing tube may be constructed of a transparent glass tube having neon gas sealed therein.

According to this construction, the transparent color-developing tube is transparent when lit out and, when lit up, turns red and therefore can construct the three primary colors together whit the other light sources.

The second light source may be constructed using a cold-athode tube that exhibits a blue color.

According to this construction, the second light source that emits a blue color light is located more remote from the light guiding means than the first light source. However, the white balance luminance of the blue color (second light source) is higher than that of each of the red and green colors (first and third light sources) that are located closer to the light guiding means. Therefore, the emission of the three primary color lights falls under a so-called "white color region".

The dots may include a complementary color dot that is colored to the complementary color of one of the light sources.

According to this construction, in even a case where no uniform plane luminescence is caused due to the difference between the incidence conditions of the respective light sources, since a strong color is absorbed by the complementary color dot and is converted to a weak color, the occurrence of color unevenness is suppressed. For this reason, the luminance is made uniform one step more.

The complementary color dot may be located in correspondence with the reflecting portion whose color brightens upon its reception of light from one of the light sources.

According to this construction, in a case where only the blue color light source alone for example is lit up and light and darkness occur more or less in the blue color of the diffusion sheet, a complementary color dot whose color is a yellow color which is the complementary color of the blue color is formed at the position corresponding to the light reflection parts. Since the blue color is absorbed by the complementary color dot, the diffusion sheet comes to have a uniform blue color, whereby the luminance becomes uniform. A purple color is used as the complementary color of the green color and a bluish green color is used as the complementary color of the red color.

DESCRIPTION OF THE PREFERRED EMBODIMENTS

A preferred embodiment of the present invention will now be explained. Note that a reference symbol G in the figure represents green, B represents blue, and R represents red.

Figure 1:
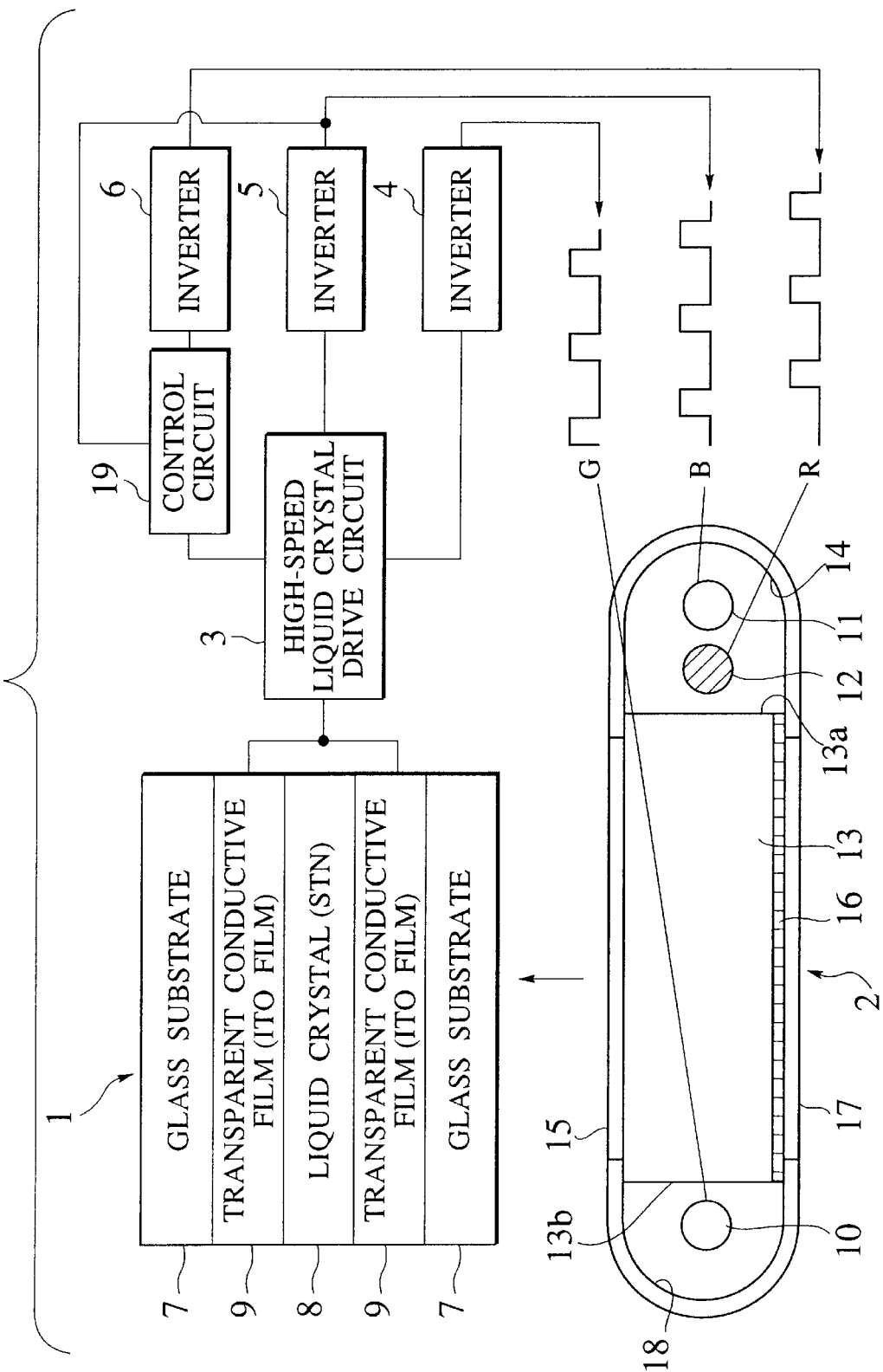
FIG. 1 is a sectional view illustrating a backlight for use in a color liquid crystal display device according to a first embodiment of the present invention.
Figure 2:
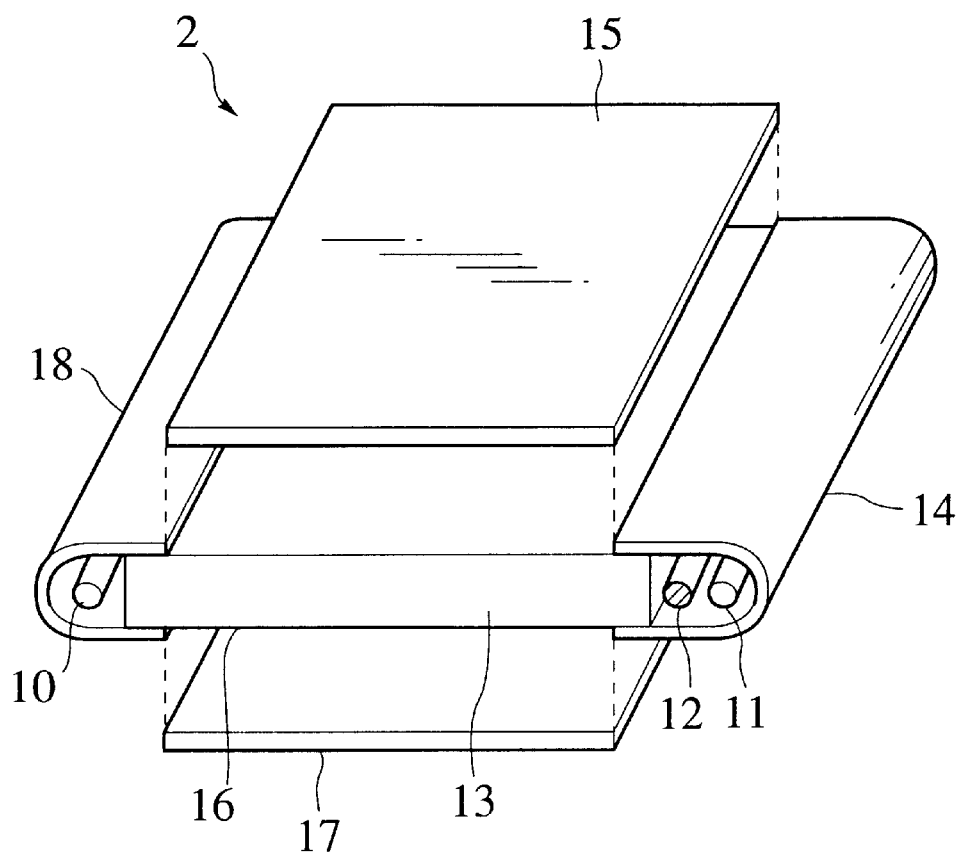
FIG. 2 is an exploded perspective view illustrating the backlight of FIG. 1.

As illustrated in FIG. 1, a backlight for use in a color liquid crystal display device according to the first embodiment comprises a liquid crystal cell 1 forming one pixel of a liquid crystal panel, a backlight 2, a high-speed liquid crystal drive circuit 3 and inverters 4, 5 and 6.

The liquid crystal 1 comprises two glass substrates 7, liquid crystal 8 (STN), and transparent conductive films (ITO film) 9. The liquid crystal 8 is sealed between the glass substrates 7. The transparent conductive films (ITO films) 9 are each disposed between the glass substrate 7 and the liquid crystal 8 in the form of a matrix. The liquid crystal 8 is made "on" or "off" through the transparent conductive film (ITO film) 9. The liquid crystal cell 1 is for use on monochromaticness and so there is no need to use a color filter and thin film transistor, and therefore its structure is simple.

The transparent conductive films (ITO film) 9 of the liquid crystal cell 1 are connected to the high-speed liquid crystal drive circuit 3. The high-speed liquid crystal drive circuit 3 has three terminals that correspond to three primary colors (red, green and blue). A terminal of the red color light source 12 is connected to an inverter 6 through the control circuit 19. Terminals of the blue color light source 11 and the green color light source 10 are respectively connected to inverters 4 and 5. The control circuit 19 controls the temperature characteristic of the red color light source L2. Output terminals of the inverters 4, 5 and 6 are connected to the ends at one side of the respective light sources 10, 11 and 12 of the backlight 2, the ends at the other side of which are earthed.

The backlight 2 is comprised of a single light guiding plate 13 serving as light guiding means, reflection mirrors 14, 18 serving as reflecting means, three light sources 10, 11 and 12 that respective give forth lights having the three primary colors, a diffusion sheet 15 serving as diffusing means, dots (dot pattern) 16, and a reflection sheet 17 serving as a reflecting member.

As the light guiding plate 13 there is used a transparent resin plate or molded part whose six surfaces are smooth and transparent. Suitable as the transparent resin are acryl, polyester, vinyl chloride, etc. The sectional area (thickness of the light guiding plate 13) of each of one end surface (light incidence surface) 13a and the other end surface (light incidence surface) 13b of the light guiding plate 13 is an important factor for causing effective introduction thereinto of lights from the light sources 10, 11 and 12. A larger amount of light can be introduced into the light guiding plate 13. However, when the light guiding plate 13 is excessively thick, it occupies a larger space. This runs counter to the decrease in weight and the reduction in size and leads also to the loss of light. The backlight 2 of this embodiment only requires the use of a single light guiding plate 13 and therefore is simple in structure and advantageous for the decrease in size and in thickness of the backlight 2 and also for the reduction in cost due to the reduction in number of the parts used such as the reflecting member, light guiding plate or the like.

The reflection mirror 14 is attached onto the one end surface 13a of the light guiding plate 13. The reflecting mirror 14 has a section of curved configuration that is open toward the one end surface 13a of the light guiding plate 13. Inside the space defined by the reflection mirror 14 there is formed a silver surface mirror having a high reflectance. The silver surface mirror introduces the lights from the light sources 11 and 12 into the light guiding plate 13 with a high efficiency and does not leak them to the outside thereof.

The reflection mirror 18 is attached onto the other end surface 13b of the light guiding plate 13. The reflection mirror 18 has a section of curved configuration that is open toward the othe end surface 13b of the light guiding plate 13. Inside the space defined by the reflection mirror 18 there is formed a silver surface mirror having a high reflectance. The silver surface mirror introduces the light from the light source 10 into the light guiding plate 13 with a high efficiency and does not leak them to the outside thereof.

The light source 10 is a cold-cathode tube which gives forth a light having a green color. The light source 11 is a cold-cathode tube which gives forth a light having a blue color. The pure green and blue colors of the lights from the light sources 10 and 11 are exhibited by luminescence of the phosphors themselves coated on the inner surfaces of the cold-cathode tubes, and this necessitates the use of no color filter.

As the light source 12 there is used a transparent color-developing tube (so-called neon tube) which is prepared by sealing a neon (Ne) gas into a transparent glass tube and which gives forth a red color light. The neon tube is easy to form, can be formed to a diameter substantially the same as that of the cold-cathode tube, and can be easily disposed in the reflection mirror 14. The light sources 10, 11 and 12 are continuously lit at the pulse periods each synchronized with the timing with which the liquid crystal is driven, and necessitate the use of no color filter or the like.

The light source 12 faces the one end surface 13a of the light guiding plate 13. The light source 11 is disposed in such a way as to be arranged along with the light source 12 on the opposite side of the light guiding plate 13. The light source 10 faces the other end surface 13b of the light guiding plate 13. The reflection mirror 14 covers the light sources 11 and 12 from around the same and the reflection mirror 18 covers the light source 10 from around the same.

The luminances (the values obtained by determining by visual experiments the proportions in which the human eyes feel the respective brightnesses of the three primary colors) of the three primary colors (red, green and blue) are adjusted by the inverters 4, 5 and 6 so as to bear the ratio of 1.5:3.5:1. The green color light source 10 is one whose luminance is most needed when adjusting so that the white color obtained from the three primary colors may be located at the central part of the so-called "white color region" adopted by CIE (Commission International de Leclairage), and therefore is disposed at the position the nearest to the light guiding plate 13b side.

The dots 16 are provided on the reverse surface of the light guiding plate 13 (the surface on a side thereof opposite to the side where the liquid crystal cell 1). The dots 16 are composed of a printing, a carving such as dots or lines, a prism, etc. The lights from the light sources 10, 11 and 12 are scattered by passing through the dots 16. In the case of a printing, an ink prepared by mixing a filler having a high refractive index into an organic resin is printed in the form of dots. The more remote from the light sources 10, 11 and 12 the dots 16 are (the more approached to the central position the dots 16 are), the more increased the surface density is. This contributes to making the luminance uniform.

The dots 16 have a white color in principle. In a state where all the light sources 10, 11 and 12 are lit up, a "white color" is exhibited theoretically. However, actually, when the light from the blue color light source 11 for example has a high luminance, the whole turns "bluish". In this case, part of the white color dots 16 is colored to a "yellow color" which is a complementary color of the blue color. Coloring of the "yellow color" is performed on the dots 16 over an entire region thereof in a suitable percentage. As a result, the "blue color" weakens with the result that the occurrence of the color unevenness is suppressed without adjusting the inverters 4, 5 and 6. On the other hand, in a case where the dots 16 turn partially "bluish", the white color dots 16 are colored to the "yellow color" which is a complementary color of the blue color, in a suitable percentage and over a range corresponding to this "partially" bluish portion. As a result, the blue color weakens and the occurrence of the color unevenness is suppressed.

The diffusion sheet 15 has a pearskin-like irregularities, and scatters and passes therethrough the light transmitted through the light guiding plate 13.

The reflection sheet 17 is constructed of a film that is made of synthetic resin (e.g., PET). The spectral reflectance of the reflection sheet 17 is approximately 95%. It is to be noted that the reflection sheet may be formed integrally with a casing (housing) not illustrated having the backlight 2 accommodated therein. When forming the reflection sheet integrally, although the spectral reflectance is somewhat decreased, the cost is reduced. According to the applicant's knowledge, in the case of the reflection sheet formed integrally, if the spectral reflectance thereof is 70% or over, no inconvenience occurs in terms of the performance.

Next, the function of this color liquid crystal display device will be explained.

From the high-speed liquid crystal drive circuit 3 there are outputted the pulse waveforms synchronized with the timing with which the liquid crystal is driven. The pulse waveform for the red color light source 12 is set such that the duty ratio is ⅓. This is for the purpose of preventing the red color form being lit at the same time as another color and mixed therewith. With regard to the green color light source 10 and blue color light source 11, also, the pulses are caused to rise in such a way that the ⅓ periods are sequentially shifted from that of the red color light source 12. Here, the duty ratio means the proportion of the application time length (the time length during which the pulse is kept rising) based on the one period of each pulse.

By the pulse waveforms the inverters 4, 5 and 6 are driven and these pulse waveforms are applied to the respective light sources 10, 11 and 12. The respective light sources 10, 11 and 12 are lit by the same pulse waveforms, provided, however, that since the respective cold-cathode tubes of the light sources 10, 11 and 12 differ, in the amount of light given off, from each other according to the efficiencies of the green, blue and red color phosphors, the heights of the pulses differ from each other.

The color lights given off from the light sources 11 and 12 are entered from the one end surface 13a of the light guiding plate 13 into this light guiding plate 13 directly or by being reflected by the reflection mirror 14. The color light given off from the light source 10 is entered from the other end surface 13b of the guiding plate 13 into this plate 13 directly or by being reflected by the reflection mirror 18. The lights having entered the light guiding plate 13 impinge upon the inner surface of the light guiding plate 13 and are repeatedly totally reflected. Part of these lights impinges upon the dot pattern 16 located on the reverse surface and is scattered to go out toward the liquid crystal cell 1. Part of the lights having impinged upon the dot pattern 16 is reflected within the light guiding plate 13 and then impinges upon the reflecting sheet 17 and is led to the liquid crystal cell 1 side.

The light which enters from the light guiding plate 13 into the liquid crystal cell 1 passes through the diffusion sheet 15. The light which passes through the diffusion sheet 15 becomes scattered light rays due to fine irregularities and pearskin-like configuration of the surface thereof. For this reason, the light sources 10, 11 and 12 themselves and the state of the dot pattern 16 are not directly seen, with the result that there is obtained the effect that the entire surface brightens uniformly.

While the light sources 10, 11 and 12 within the backlight 2 are sequentially making their pulse luminescence at a high speed as mentioned previously, the liquid crystal 8 in the liquid crystal cell 1 opens with the same timing as that with which color luminescence is made thorough the control of the high-speed liquid crystal drive circuit 3. The color light that corresponds to the timing with which the liquid crystal 8 has opened passes through the liquid crystal cell 1 and this color is displayed. Mixing of one color and another is performed by opening the liquid crystal 8 with the timing corresponding to that of the another color. For example, by opening the liquid crystal 8 with the both timings corresponding to the red color light source 12 and green color light source 10, the yellow color which is a mixed color of the red and the green color is displayed. Also, by mixing three colors of the red, the green and the blue color with the liquid crystal 8 being kept open, the white color is displayed. This is a residual image color mixture that occurs due to the fact that the time length during which the pulses that correspond to the light sources 10, 11 and 12 rise is sufficiently shorter than the residual image time length of the eyes. It is to be noted that the adjustment of the white color is performed by adjusting the amount-of-light (luminance) ratio among the respective light sources 10, 11 and 12 by adjusting the output currents of the inverters 4, 5 and 6.

Since the color display device of this embodiment uses no color filter, the liquid crystal cell is easier to manufacture than the conventional color liquid crystal display device which uses color filters. Also, with regard to the backlight 2, while the TFT type only requires the use of a single white-color light source, this embodiment requires the use of the three light sources 10, 11 and 12. Therefore, naturally, this embodiment is disadvantageous from the viewpoint of the miniaturization and thinning of the device. However, as mentioned previously, the light guiding plate 13 has only to be one in number and the structure is a type wherein the light sources 10, 11 and 12 are accommodated within the reflecting mirror 14. Therefore, the miniaturization and thinning of the backlight 2 are possible. Also, for the same reason, the reduction in cost due to the reduction in number of the parts used can be achieved.

Additionally, although in this embodiment the duty ratio of the pulses applied to the respective light sources 10, 11 and 12 is set to a maximum value of ⅓, according to the relationship with the liquid crystal cell 1 the duty ratio may be set to a value smaller than ⅓. Also, the reflection mirrors 14 and 18 may each be a reflecting member that is made by kneading white color material into a synthetic resin (e.g., PET).

Also, of the light sources 10, 11 and 12, the two light sources 11 and 12 thereof are disposed opposing the one end surface 13a of the light guiding plate 13 and the remaining one light source 10 is disposed opposing the other end surface 13b of the light guiding plate 13. For this reason, the probability that when light enters into the light guiding plate 13, this light is hindered by another light source decreases, with the result that the loss of the light becomes lessened to that extent. Accordingly, the amount of light emission increases.

A simulation regarding the increase in the amount of light emission will hereafter be explained. The experimental conditions are as follows. The diameter of each of the light sources 10, 11 and 12 is 2 mm; the thickness of the light guiding plate 13 is 5 mm; the distance between the centers of the light sources 10 and 12 and the one end surface 13a and other end surface 13b is 1 mm; the center-to-center distance of the light sources 11 and 12 is 4 mm; and the center-to-center distance of the reflection mirror 14 and light source 11 is 2.5 mm. Also, a non-transparent tube was used as the light source 12. The result of the simulation showed that assuming that the incidence efficiency from the light source 12 upon the light guiding plate 13 be 100%, the incidence efficiency from the light source 11 upon the light guiding plate 13 became 79% and did not become lower so much compared to the incidence efficiency from the light source 12 thereupon. The reason for this is that whereas the light from the light source 11 is hindered by the light source 12, the reflecting mirror is located close to that light source 11. On the other hand, the light source 10 is located close to the other end surface 13b of the light guiding plate 13 and reflecting mirror 18. For this reason, the incidence efficiency from the light source 10 upon the light guiding plate 13 becomes 196% and therefore the luminance of the light from the light source 10 becomes approximately two times as high as that of the light from the light source 12.

A simulation that regards the amount of light emission when having used as the light source 12 a transparent glass tube having a neon gas sealed thereinto will hereafter be explained. The experimental conditions such as the diameter of the light sources 10, 11 and 12, thickness of the light guiding plate 13, and relative disposition relationship between the reflection mirrors 14 and 18 and the light sources 10 and 11 are the same as those of the above-described preceding simulation. The result of this simulation shows that whereas the incidence efficiency from the light source 12 upon the light guiding plate 13 was 100% in the preceding simulation using a cold-cathode tube as the light source 12, it becomes 161% in the present simulation using a transparent glass tube having a neon gas sealed thereinto, exhibiting a remarkable increase. The reason for this is due to the fact that at the time when the light source 12 is lit up, the percentage of the amount of light absorbed by the light source 12 itself decreases. The incidence efficiency from the light source 11 upon the light guiding plate 13 is 89%, indicating a 10% increase compared to the preceding simulation using a cold-cathode tube. The reason for this is that a transparent glass tube kept lit out is more excellent in transparency than a cold-cathode tube and therefore is less influenced by the light source 12. The incidence efficiency from the light source 10 upon the other end portion 13b of the light guiding plate 13 exhibits a high value of 196% as in the case of the preceding simulation.

Namely, since the red color light source 12 is kept transparent when not lit up, it does not hinder the passage of light. Therefore, at the time when lit up, the red color light source 12 gives off a red color light and thereby constitutes the three primary colors together with the other light sources 10 and 11. At the time when lit out, it does not hinder the incidence of the light from the light source 11 upon the light guiding plate 13.

The blue color light source 11 is disposed at a position remote from the one end surface 13a of the light guiding plate 13. However, the blue color light source 11 is located in the proximity of the reflection mirror 14 and therefore has a high reflection luminance. In addition, the blue color light source 11 has a high white balance luminance compared to the other red color light source 12 and green color light source 10. For this reason, emission of the three primary color lights causes a so-called "white color region" to be excellently formed.

Next, a second embodiment of the present invention will be explained.

This second embodiment is one wherein dots 20 are provided in place of the dots 16 of the first embodiment and the other construction thereof is the same as that of the first embodiment. Therefore, the constructions thereof other than the dots 20 are denoted by the same reference symbols and an explanation concerned therewith is omitted.

The dots 20 are printed on a reverse surface (the surface on a side opposite to the side of the liquid crystal cell 1) of the light guiding plate 13. Specifically, an ink prepared by mixing a filler having a high refractive index into organic resin is printed in the form of dots. As a result of this, the lights from the light sources 10, 11 and 12 are scattered by the dots 20.

Figure 3:
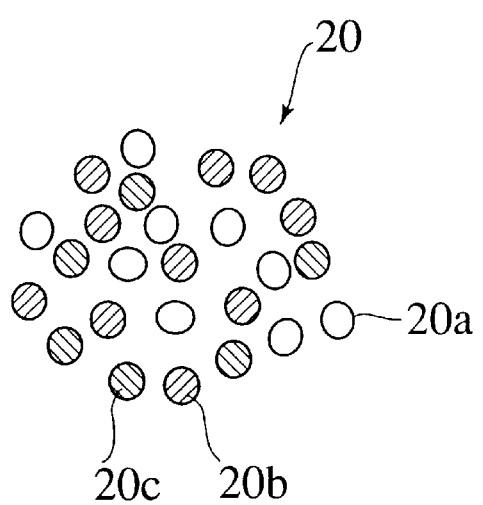
FIG. 3 illustrates a dot pattern that has been formed on the surface of light guiding means according to a second embodiment of the present invention.

As illustrated in FIG. 3, the dots 20 are composed of first complementary color dots 20a that are colored to a purple color (i.e., a mixed color of blue color and red color) which is a complementary color of a green color, second complementary color dots 20b that are colored to a yellow color which is a complementary color of a blue color, and third complementary color dots 20c that are colored to a bluish green (i.e., a mixed color of blue color and green color) which is a complementary color of a red color. The intensity of the unevenness of the color lightness and darkness and the position of occurrence thereof occur in correspondence with the disposition positions of the light sources 10, 11 and 12. For this reason, the respective dot patterns of the first, second and third complementary color dots 20a, 20b and 20c are set so that, determining in what color the unevenness of the lightness and darkness occurs with no dots 20 being in existence, the occurrence of the unevenness of the lightness and darkness may be excellently suppressed according to the results thus determined.

The light that enters from the light guiding plate 13 into the liquid crystal cell 1 passes through the diffusion sheet 15. The light that passes through the diffusion sheet 15 becomes scattered light rays due to the fine irregularities and pearskin-like configuration of the surface thereof, with the result that the light sources 10, 11 and 12 themselves and pattern of the dots 20 are not directly seen and therefore the surface thereof brightens uniformly as a whole. At this time, since the dots 20 have suitable colors imparted thereto beforehand, i.e., the first, second and third dots 20a, 20b and 20c with a suitable dot pattern are applied to the reverse surface of the light guiding plate 13 so that no color unevenness may occur on the diffusion sheet 15, a uniform luminance is obtained.

The light guiding means is not limited to the light guiding plate 13 of the above-described embodiment. The light guiding means may be one which is formed to be hollow and is comprised of a reflection layer formed by deposition of aluminum and provided on the surface thereof on a side opposite to the side of the liquid crystal cell 1 and a prism surface on the side of the liquid crystal cell 1. Further, the configuration of each of the reflection mirrors 14 and 18 is not limited to a section of a curved configuration that is open toward a corresponding one of the one end surface 13a and other end surface 13b, and may be a configuration which clamps the light source 10, 11 or 12 from above and below the same. In this case, it is sufficient that a silver mirror surface having a high reflectance be formed on the surface opposed to the light source 10, 11 or 12. Further, the reflection mirrors 14 and 18 may be silver mirror surfaces having a high reflectance which have been bonded onto the peripheral surface of the light sources 10, 11 and 12.

What is claimed is:

1. A color display device, comprising:

singular light guiding means facing a liquid crystal cell;

first, second and third light sources which respectively independently exhibit three primary colors, the first and second light sources disposed on one end surface side of the light guiding means and the third light source disposed on the other end surface side thereof;

diffusing means provided on one surface of the light guiding means, said one surface facing the liquid crystal cell;

dots provided on the other surface of the light guiding means, lights from the light sources being scattered by passing through the dots, the dots including a complementary color dot corresponding to one of the light sources; and a reflecting member covering the other surface of the light guiding means.

2. A color display device according to claim 1, further comprising:

reflecting means disposed on the one end surface side and on the other end surface side of the light guiding means, the reflecting means directing light from the light sources toward the light guiding means.

3. A color display device according to claim 1, wherein the light sources make their pulse luminescence in synchronism with the timing with which a liquid crystal of the liquid crystal cell is driven.

4. A color display device according to claim 1, wherein the diffusing means consists of a diffusing sheet.

5. A color display device according to claim 1, wherein the dots include first complementary color dots second complementary color dots, and third complementary color dots.

6. A color display device according to claim 5, wherein the dots are positioned on said light guiding means to suppress an unevenness of color lightness and corresponding to a position of said first, second, and third light sources.

7. A color display device according to claim 1, wherein the complementary color dot is located in correspondence with a reflection portion where color from said one of the light sources brightens.

8. A color display device, comprising;

singular light guiding means facing a liquid crystal cell; and first, second and third light sources which respectively independently exhibit three primary colors, the and second light sources disposed on a one end surface side of the light guiding means and the third light source disposed on the other end surface thereof, the firs light source consisting of a transparent color-developing tube and being located between the light guiding means and the second light source.

9. A color display device according to claim 8, wherein the transparent color-developing tube is a transparent glass tube having a neon gas sealed therein.

10. A color display device according to claim 8, wherein the second light source is a cold-cathode tube that exhibits a blue color.

* * * * *